3,369,308
TEACHING MACHINE AND METHOD
Charles A. Curran, 215 E. Chestnut, Chicago, Ill.  60611
Filed Sept. 16, 1965, Ser. No. 487,691
5 Claims. (Cl. 35—35)

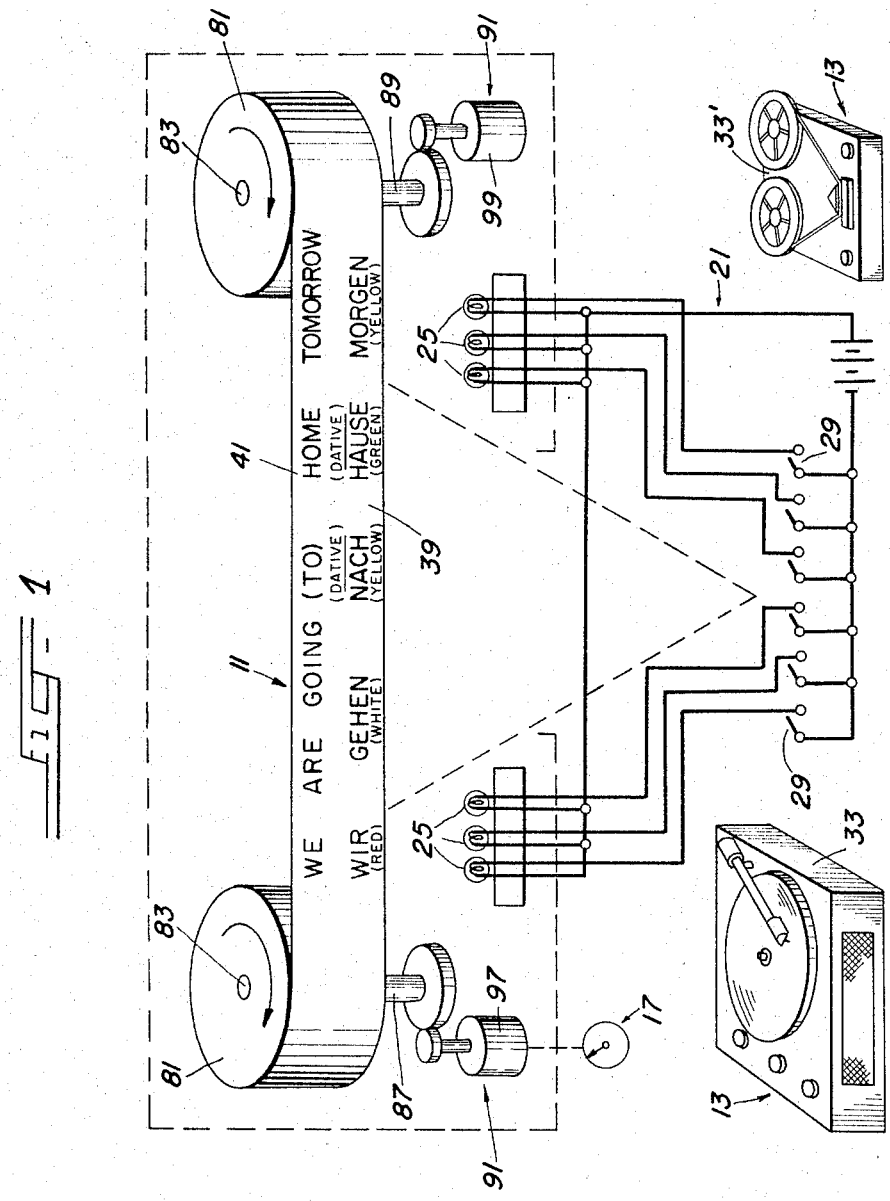

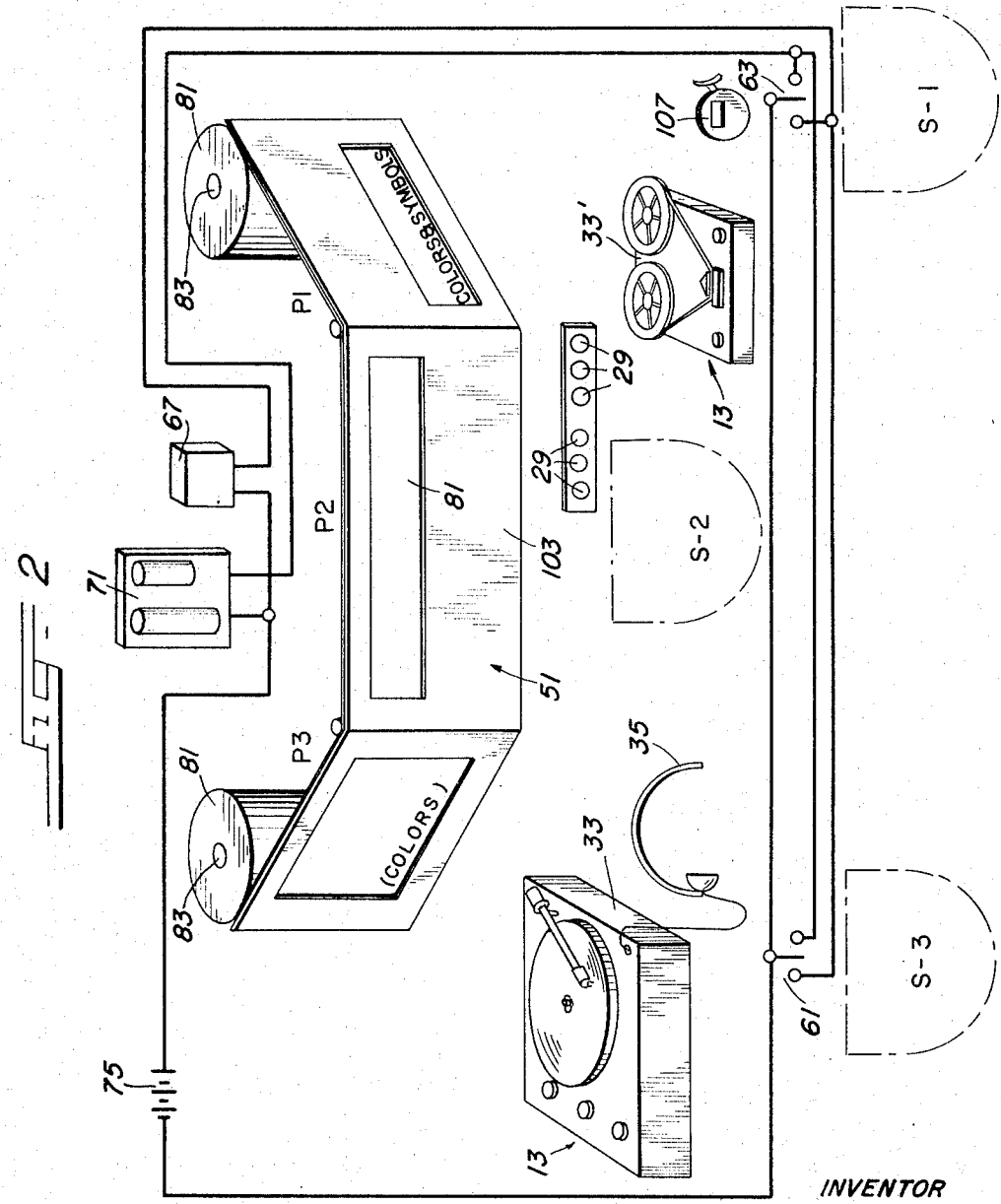

ABSTRACT OF THE DISCLOSURE

A teaching method for presenting information orally and visually to evoke coordinated visual, oral, cortical and tactile activity in a student's learning experience and including in combination with visual and audio means, a plurality of lamp means of different colors selectively actuable by the student in response to recognition by the student of a particular grammatical usage involved in the information presented, each color being correlated with a specific grammatical usage.

---

This invention relates generally to a teaching system including a method and apparatus for use in teaching languages. More particularly, the invention is directed to a method and apparatus by means of which an unknown language is taught in relation to a known language through a technique which invokes concurrent and coordinated exercise and use of the senses of touch, sound, and sight.

It is an important feature of the invention that the user is called upon to employ his vision, hearing, sense of color detection, and motor ability in a completely absorbing concentration-demanding learning experience. It is the aim of the present invention to provide an improved system finding special utility in the teaching of foreign languages and in which the advantages of oral presentation, visual examination and recognition, and tactile identification and correlation are utilized, in combination, to effect a vivid and active learning experience.

A principal object of the invention is to provide a method in which the known and unknown language are presented simultaneously on a visual information carrier while audio means presents a prerecorded text corresponding to visual information carried by the visual information carrier.

It is a related important object of the invention to provide a method for use in teaching a foreign language, in which method a two track visual tape is observed concurrently with the presentation of oral information corresponding to the foreign language displayed visually. At the same time the viewer is called upon to exercise cortical analysis of the visual information and to tactfully identify grammatical usage of a presented visual text.

It is a related object of the invention to provide a language teaching apparatus in which the learner or operator manually controls the rate of passage of a visual text through a field of view in correlation or synchronization with concurrent audio presentation of a foreign language sequence which corresponds to a foreign language visual text carried by the moving tape.

A still further object of the invention is to provide an apparatus for visually presenting a written text of a foreign language and in which the word and phrase elements of the foreign text are color-coded to indicate in each case the grammatical role or usage of the language element.

A related object of the invention is to provide a finger-controlled keyboard of switches for selectively actuating or illuminating any of a plurality of different colored bulbs to indicate, upon recognition, the particular grammatical usages of the words and phrases of the foreign language displayed on a field of view.

A further object of the invention is to provide a language teaching system in which the student's proficiency in identifying parts of speech and grammatical usage is monitored and in which audio signal means are utilized to indicate either correctness or incorrectness of the student's analysis.

Other and further objects and advantages of the invention will become apparent from a reading of the following specification taken in conjunction with the drawing in which:

FIGURE 1 is a diagrammatic representation of the teaching system of the invention and illustrating means for presenting information visually and audially, as well as means for color-coding and correlation of the color-coding with grammatical usage of the visual information portrayed; and FIGURE 2 is a diagrammatic representation of the elements of the teaching system of the invention and including means for monitoring the performance of the student and for indicating correct answers and errors.

The teaching system of the present invention utilizes both apparatus, and techniques or procedures, and is particularly adapted as a technique in the teaching of foreign languages. In addition to invoking the use of vision and hearing, the present system calls for utilization of the sense of color detection as well as for the exercise of motor ability. That is, the effective and contemplated use of the machine requires the utilization of substantially all of the senses except the olfactory sense, and, thus, is effective to demand an unusually high degree of concentration.

Referring more particularly to the drawing, there is shown in FIGURES 1 and 2, for the purpose of illustrative disclosure, a preferred embodiment of the system of the invention. FIGURE 1 illustrates the system as including interrelated and cooperating elements for evoking coordinated visual, oral, cortical and tactile activity in a learning experience. The component elements of the system include a visual information carrier 11, audio means 13 for presenting pre-recorded information corresponding to the information carried by the visual means, control means 17 for coordinating and synchronizing the presentation of the visual information in correspondence with the oral information, electric circuit means 21 selectively operable for actuating any of a plurality of illuminating elements 25 each providing a different visible color, and each color being correlated with a particular grammatical usage of the visual information presented on the visual information carrier 11. The color coding feature of the invention constitutes an important inventive concept based upon a theory of inner codal communication which will be described in the paragraphs below. In the discussion and explanation which follows, the term "Chromacord" is used to designate the apparatus of the invention as well as the methods and techniques. The term itself has specific reference to the novel color-coding and coordinating feature of the invention.

FIGURE 2 illustrates a somewhat modified form of the teaching system of the invention and includes means whereby an instructor, or another student, may monitor the progress of the student to ascertain his accuracy and proficiency and to detect any errors he may make, particularly with respect to the student's actuation of the color coding keys 29. These keys are depressed by the student to indicate the particular parts of speech or the grammatical usage of elements of the portrayed text. In accordance with the practice of the invention, not only is the color-coding monitored, but as depicted schematically in FIGURE 2, the audio text which corresponds to the foreign language visual text is played on a suitable tape machine 33' or record player 33 and a monitor listens to the audio text by means of suitable earphones 35. The person monitoring is thus enabled to correct the student as the latter pronounces the words displayed in his field of view. Thus, as illustrated in FIGURE 2, three distinct areas of participation are involved. In the centrally disposed or number 2 area (P2) the student observes the visual text material as it passes before him. At the same time, he operates a manual or a motor control means 17 through which he regulates the rate of travel of the visual text carrier 11. Two distinct texts appear on the carrier 11. These texts comprise the unknown language text 39 and, in substantial vertical alignment therewith, the translation 41. In one form of the text carrier, each of the word elements or word phrases is color-coded to indicate its particular grammatical role or usage. The colors utilized correspond to respective colored lamps or lights 25 which may be actuated or illuminated through depression of the color-coding keys 29. As the student gains proficiency, a restricted viewing mask 51 is positioned between the student and the laterally moving tapes so that the color coding designations are not visible to the student. The student will, then, upon recognition of the particular grammatical usage of a word or phrase, depress the appropriate color coding key 29 to indicate that part of speech or usage. At the same time, a monitoring student or an instructor positioned at a second location indicated schematically as position number 1 (P1) will observe the illumination or the color-designations actuated by the student and will be able to judge the correctness or to detect any errors in the student's action. The position number 3 (P3) indicated schematically in FIGURE 2 is provided for still additional monitoring.

In order to facilitate advising the student of the correctness or of any error in his color-coding or in his pronunciation, an electrical circuit is provided as indicated schematically in FIGURE 2. This circuit includes switches 61 and 63 for selectively energizing a buzzer 67 to indicate an error, or a chime or bell 71 to indicate a correct answer. The electrical circuit is conventional and includes the usual power supply or battery 75.

In a preferred embodiment of the invention the visual information carrier 11 comprises a paper tape 81, which may conveniently be a tape such as is commonly used in adding machines. The tapes are on reels 83 which are rotatably supported on axles or shafts 87 and 89. Suitable drive means and linkages, indicated schematically 91 are provided to propel the tape laterally across a field of view in either direction. While the foregoing brief discussion of the drawings provides a general understanding of the aims, methods, and over-all operation of the teaching system of the invention, a more complete understanding will be afforded through the following discussion of the theories of learning which play important parts in the success of this invention.

Basic to the aims and purposes of the teaching machine and method of the invention and its elements of originality and novelty are some unique theories of learning resulting from a long period of psychological and linguistic research. First there is the question why a small child learns and retains a "foreign" language so much better than an adolescent or an adult. Research carried out during development of the invention has led to a theory of an *inner codal communication system* that, in the small child, does not depend or depends only minimally on the cortex since the small child does not think and reflect on himself nearly as much as does an adolescent or an adult. Not using his cortex so much in analysis and synthesis, the small child depends rather on sense coordination and conditioning. This, in certain types of learning such as languages, proves more efficient since he is depending on sight, sound, and speech coordination in place of the more sophisticated but less efficient (for language learning) cortical analysis and synthesis.

Therefore, while the adolescent or the adult gains immeasurably in thinking power and reflection through increased cortical focus, under the theory proposed herein he loses the efficiency of this somewhat hypothalamically sense-oriented learning that is so marked in a small child.

This theory helps to explain then why, in foreign language learning and similar tasks that are primarily concerned with relating sight to sound and object and then reproducing it with the tongue, the small child more quickly achieves this process. He does this by depending on his basic senses of touch, sound and sight working together in place of the more complicated cortical analysis of an adult. The adult thus needs an apparatus which will allow him the same kind of learning and retention—sense oriented in place of only cortical analysis—so that he has the primitive learning efficiency of the small child combined with the sophisticated grammar discrimination of an adult.

The machine of the invention, has, therefore, been devised with the aim of affording the learner—child, adolescent or adult—a coordinated psychosomatic learning process that discriminates through the basic senses of touch (a particular finger for each significant cortical discrimination) and sight (a particular color always associated with the same key and the same cortical discrimination).

The touch and sight elements are then simultaneously combined with a moving visual tape carrying words colored in symbolic designs, and a corresponding sound tape in a *free* synchronization so that a learning discrimination process is involved even in the operation and proper movement of the tape. In other words, in contrast to film where sound and sight are *fixed*, there is here a unique learning component in *hearing*, for example, the German words of a song or poem and matching them with the English and German words seen on the free moving visual tape.

This free movement may be provided through any preferred method, but in the particular embodiment of the invention illustrated, is achieved by means of separate geared motors 97 and 99 which, in cooperation with switches or voltage controls, enable the operator to go fast or slow as he matches the words of the song, poem, opera or conversation *heard* in the foreign language but *seen* in the foreign language and English with symbolic color designs to indicate genders, grammar, etc.

Simultaneously, he can play on the color keys 29, the proper corresponding color which then lights up on a separate section on a panel at either the sides or below the window where the visual tape 81 is seen.

As indicated above, the novel features and elements of the machine and method includes several cooperating and interdependent features. One of these is the combination of movements or the tape programming (that is a special arrangement: The way in which the words appear on the tape 81 and the manner in which they are colored and the geometric symbolic designs), and the color key response which psychosomatically involves the learner.

In what is referred to as the "Chromacord," the learner by tactile identification of a particular finger or a particular key and by simultaneous visual awareness of a particular color on a precise place on the visual board 103 just below the moving tape, has a profound and neurologically complicated identification with each minute learning moment of experience.

Ordinarily a learner abstractly memorizes or otherwise vaguely focuses on objects to be learned, for example, a list of foreign words and their genders. But through the Chromacord and its programmed tape, he has a variety of experiences that are (a) *tactile* (at the end of a precise finger); (b) *visual* (each color has a special significance: red=a masculine noun, for example, or it can mean, in a different position and on the left hand third finger rather than the right, an unexpected word very different from the English word); and (c) *cortical* (he must analyze accurately the word significance to push correctly the correct key for any of a wide variety of colors possible; he thus must discriminate most attentively); and (d) *aurally* (the visual tape 81 is correlated with a sound track on the associated sound tape machine 13 which thus gives him a precise and accurate sound experience). (As we have said, the learner controls this himself and thus is learning as he synchronizes the visual word seen with the sound heard.)

A still further feature is the manner in which this apparatus reduces anxiety in the learner by giving him complete control of the speed of the visual tape and the number of repetitions of both the visual and sound tapes. He is thus able to progress at his own learning speed, secure in the control he has over the machine. By contrast, the presence of the teacher often impedes learning somewhat by tightening and even panicking the learner when he cannot immediately say correctly what the teacher wants. The visual tape is so written that the student proceeds, by careful steps, from the simple to the complex so that he experiences success rather than failure and is thus reassured to continue to the next stage.

As he becomes more proficient the student can speed up the visual tape so that it corresponds to very rapid speech. He is thus prepared psychologically when he encounters this rapid speech in speaking with natives. These are situations where he often panics and even though he knows many words, he cannot understand or speak without training similar to that which the apparatus of the invention affords. His anxiety impedes the use of what he has simply memorized and could write if given enough time. This machine helps him, and brings his knowledge to immediate and very rapid use.

From the above description, it is evident that, while the Chromacord feature of playing the color to correspond to the sound heard on the tape or phonographic disc can thus be considered as a separate function, it has its maximum use when associated with the moving tape especially programmed to fit it. Since in the preferred embodiment of the invention paper tapes are used, the tapes are inexpensive to produce, allowing the teacher or the students themselves to make their own study programs. The use of the paper tape and the program related to it as it relates to the Chromacord are a special and intrinsic part and novelty in this invention. Tapes having a transverse dimension of ¼" to ½" or 2" or 3", or larger, may be used. These larger tapes can be purchased at low cost since they are produced in large quantities for use in adding machines and similar devices. However, the manner of programming of this tape and of adapting it to the playing of colors as part of a psychosomatic learning process is a unique application of the tape and is a most important feature of the invention.

The technique by which the motors are controlled is also a unique feature in the learning process. The tape 81 does not simply pass across the visual field as might be true of a film. Rather it is moved and controlled in such a way that it is synchronized by the student, and this synchronization itself constitutes the process of learning. This is so because of the unique way in which the tape is inscribed as it relates to the sound and color analysis pecularly possible with this apparatus. For example, as the student is listening to a native German read a German poem on a phonograph record or a sound tape, the unique feature of the way the motors 97 and 99 function in this machine is that the student must synchronize, by a hand switch 17 which controls the speed of the visual tape, the sound he is hearing. He matches this sound with the words on the tape that, in the first stage, is German below and English above. At the same time the German words are colored with particular geometrical symbols, designs, or lines, which give him clues as to which colors and in which combinations of colors he must play the tape for the correct grammatical analysis (green being neuter; orange the subjunctive; two parallel lines in front of the words being the genitive case).

Another unique element of the teaching system of the invention is also the way the machine, in combination with the specially prepared visual tape, furthers *discrimination* in the learner. As the student is synchronizing the moving motor tape with his left hand, by playing the colors on the color keyboard he is analyzing the precise grammatical components in each word in the poem, song, conversation or word list. In the second phase of the tape then, he sees only the German which he must synchronize with the German sound he is hearing and at the same time analyze correctly its grammatical role by playing the correct colors which he learned from stage one. A third phase of the tape interrelated here reproduces only the English. The student then reproduces the proper colors and the corresponding German. To do this correctly, he therefore must remember not only the precise German phrases as he translates the English but, by the use of the color keys, he must discriminate the proper grammar to fit his German translation. In this sense one can say that the tape, used in this way in combination with the synchronizing motor, adds a further aspect to the unique learning feature of this apparatus.

While the Chromacord can be used effectively by one person as learner, it can also be used by two, three or more persons functioning together in what may be called a "community learning" process. A further uniqueness, therefore, is that the Chromacord has three or more windows (positions 1, 2, and 3) and the paper tape can be so incribed that while the operator and learner is in position 2, the center position, the person in position 1 at his right sees the correct answer with the proper colors while the person in position 2, seeing only the words without the colors and designs, is in the testing stage.

Three additional features constitute other unique parts of this machine. The person in position 1 has a hand switch 63 for actuating an electric buzzer 67 tone and an electric chime 71 tone as well as a counter 107 on which he records the mistakes the person in position 2 has made, since he sees the part which has not yet passed in front of the person in position 2 who was in the learning position. The student in position 1 can buzz or chime the learner depending upon whether the latter has used the correct or incorrect color. Successes and failures can be recorded on a hand counter attached to the machine. Working alone a person can do this positive and negative re-enforcement himself after he sees the correct answer.

A third window position 3 on the left side of the learner in the central position, allows the student to listen with earphones 35 to the correct pronunciation having also the visual tape words in front of him. He thus closes a switch 61 to buzz or chime and records successes and failures as he judges whether the student in position 2, the learning position, has pronounced the word as he, the student in position 3, hears it on the earphones. In this case the student in the learning position 2, does not hear the sound tape or recording directly but knows how well he did by whether he is chimed or buzzed by the person hearing the correct pronunciation on the earphones.

Research has established that the person in position 3, listening very carefully for the correct sound from the expert on the tape or phonograph disc, can better make a rather accurate judgment as to how well his fellow student in position 2 has pronounced the word. The sound tape is so constructed that he hears it again pronounced correctly on the sound tape. Only then does he buzz or chime indicating whether in his judgment the student in position 2 pronounces the word poorly or correctly. In this way the students in positions 1 and 3 are also in intense learning situations as they observe and record by buzzing or chiming and numbering on a hand counter, the number of successes or failures of the person in position 2. The added learning features in positions 1 and 3, the correction re-enforcement for the person in position 2, are further unique and new features of this machine.

In a preferred procedure, the students change position every 15 minutes, that is, position 1 moves to position 2; position 2 moves to position 3; position 3 moves to position 1. The machine thus used is a complete self-contained learning device which totally absorbs the attention of three or more students with a program on a record or sound tape and visual tape to correspond exactly to the needs and nature of how the Chromacord machine works. In this way it is an effective self-learning device.

The machine thus designed is therefore adapted not only to two persons, or to one person and a *teacher* sitting in the correcting position 3, but also to three students, each in a position to correct one another as they take turns being in the central place. Seats or students S–1, S–2, and S–3 are indicated schematically in FIGURE 2.

A further adaptation of the machine of the invention involves a revolving head which turns the tape up from its side position and a swinging arm which brings over an opaque projector. Used this way, the content of the tape can be immediately checked on a screen so that 20 or more people may see it, and the colors played on the Chromacord are also visible on the screen. This combination of the Chromacord and the Opaque Projector are considered unique features whereby a group of 20 or more students can participate in all the activities of the machine while one, two or three people (one of whom can be the teacher) operate the moving tape and play the proper colors inter-related with the poem, song, grammar text, etc., as previously described.

Its many novel features give the machine an almost unlimited use for a large audience, each member of which, as an observer watching a game, is deeply involved in the success or failure of the individuals who are directly controlling and using the Chromacord. Changing the three persons on the apparatus at 10-minute intervals will thus allow 18 students in an hour class to have had a deep and intense participant experience for 10 minutes and a very involved observer experience in the success or failure of the other students who perform, for the other 50 minutes. (At 5-minute intervals this would involve 36 students in an hour.)

In summary then the learning apparatus of the invention involves many combined novelties, including playing an instrument to music, poetry, conversation, etc., the keys of the "instrument" being color-oriented in the sense of a color machine. In combination with sound and a free moving visual tape especially programmed, the machine affords a unique learning experience. Testing self by oneself or in competition with one or more other students (similar to the appeal of a pin-ball machine) and receiving their correction, is also contemplated. All participants learn as they offer these corrections, accurately guided as they are by the visual and sound tapes. The apparatus is provided with a self-scoring device (counter) as well as positive and negative re-enforcements by means of chimes and buzzer to reward success and punish failure. In combination with an opaque-projector, the machine can be made available for use by a large group of 20 or more. This machine, therefore, is a valuable addition to the now-existing foreign language laboratories and similar teaching and learning devices. But these are mainly concerned with sound or only passively involve the student, as in watching a film. In contrast, the subject machine affords active, concentrated and discriminating psychosomatic learning involvement (cortex, sight, hearing, speaking and touch).

It is evident that while the invention has been disclosed and described in some detail and in connection with specific constructions and embodiments, these are to be considered as illustrative and not restrictive in character, since many modifications may readily suggest themselves to those skilled in this art. Accordingly, it is intended by the appended claims to cover all such modifications as come within the true spirit and scope of the invention.

What is claimed is:

1. A teaching method for presenting information both visually and orally, and for evoking coordinated visual, oral, cortical and tactile activity in a learning experience and comprising the steps of:

moving supporting a tape-like visual information carrier having imprinted thereon words presenting a language sequence, said words being color-coded for correlation with usage of said words in said language sequence, driving said visual information carrier at controlled speeds to present said language sequence imprinted thereon, presenting prerecorded aural information corresponding to said language sequence, regulating said driving of said carrier to coordinate and synchronize presentation of said language sequence with said aural information, and actuating switch means to present any of a plurality of symbolic colors upon tactile identification and actuation of any of a particular said switch means corresponding to any of said colors, said tactile identification being associated with and in response to cortical analysis of visual information represented by said words of said language sequence, said colors being correlated with specific parts of speech and usage of said color-coded words imprinted on said tape-like visual information carrier.

2. The method of claim 1 and further comprising the step of listening by means of a head set to monitor a student's performance in pronunciation of said language sequence presented on said visual information carrier.

3. A teaching method comprising the steps of:

moving through a field of view a visual tape carrying a plurality of scripts of different languages, one of said languages being an unknown language and another of said languages being a translation into a known language of said unknown language to be learned, one of said scripts comprising a sequence of color-coded word representations extending lineally of said tape for controlled movement through said field of view, correlating corresponding said word representations of said scripts of said known language and said language to be learned to provide a continuity of said translation transposed in transverse alignment with a corresponding continuity of said unknown language, reproducing an audio language sequence through the use of electro-mechanical means, said audio language sequence corresponding to said script of said language to be learned, regulating speed of movement of said tape through said field of view for operator-controlled synchronization of said visual script with said audio sequence, and selectively illuminating any of a plurality of electric illuminating lamps each adapted to emit a predetermined different color for correlation with said color-coded word representations on said visual tape.

4. In a teaching method including the steps of presenting information orally and visually and effective to evoke coordinated visual, oral, cortical and tactile activity in a student's learning experience, the improvement which comprises the steps of:

providing for use in said learning experience electric circuit means including lamp means and lamp-actuating switch means, providing a tape-carried color-coded language sequence, selectively actuating any of a plurality of said switch means, each said switch means being electrically connected to effect illumination of a different colored said lamp means, each color of said lamp means being correlated with a specific part of speech and usage of words on said color-coded tape-carried language sequence presented to a student in said learning experience, the switch actuating step comprising a student's response to recognition by him of a particular part of speech and usage of each of said words involved in information presented to him, and being effective to illuminate a lamp having a particular selected color, the color selected by the student being indicative of that part of speech and usage elected by him as being correct for the information as presented.

5. The improvement as set forth in claim 4 and further comprising the step of visually monitoring sequences and patterns of color illuminations produced by the student through his selective actuation of said switch means.

References Cited

UNITED STATES PATENTS

| 2,900,741 | 8/1959 | McIver | 35—35 |
| 2,950,543 | 8/1960 | Ritter et al. | 35—35.3 |
| 3,069,789 | 12/1962 | Knight et al. | 35—35.3 |
| 3,220,126 | 11/1965 | Gabrielsen | 35—8.1 |

EUGENE R. CAPOZIO, *Primary Examiner.*

W. GRIEB, *Examiner.*

UNITED STATES PATENT OFFICE
CERTIFICATE OF CORRECTION

Patent No. 3,369,308                 February 20, 1968

Charles A. Curran

It is certified that error appears in the above identified patent and that said Letters Patent are hereby corrected as shown below:

Column 1, line 50, for "tactfully" read -- tactily --; column 8, line 3, for "moving" read -- movably --.

Signed and sealed this 24th day of June 1969.

(SEAL)
Attest:

Edward M. Fletcher, Jr.                     WILLIAM E. SCHUYLER, JR.
Attesting Officer                                 Commissioner of Patents